US011550865B2

(12) United States Patent
Phan et al.

(10) Patent No.: US 11,550,865 B2
(45) Date of Patent: Jan. 10, 2023

(54) TRUNCATED SEARCH RESULTS THAT PRESERVE THE MOST RELEVANT PORTIONS

(71) Applicant: DROPBOX, INC., San Francisco, CA (US)

(72) Inventors: Daniel Phan, Seattle, WA (US); Jason Perez, San Francisco, CA (US); Amy Sung, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 233 days.

(21) Appl. No.: 16/544,409

(22) Filed: Aug. 19, 2019

(65) Prior Publication Data

US 2021/0056155 A1 Feb. 25, 2021

(51) Int. Cl.
*G06F 16/9538* (2019.01)
*G06F 16/25* (2019.01)

(52) U.S. Cl.
CPC ........ *G06F 16/9538* (2019.01); *G06F 16/258* (2019.01)

(58) Field of Classification Search
CPC . G06F 16/9538; G06F 16/258; G06F 16/9577
See application file for complete search history.

(56) References Cited

U.S. PATENT DOCUMENTS

| | | | |
|---|---|---|---|
| 7,814,112 B2 | 10/2010 | Gupta et al. | |
| 8,005,825 B1 | 8/2011 | Ghosh | |
| 2008/0098300 A1 | 4/2008 | Corrales et al. | |
| 2013/0097482 A1* | 4/2013 | Marantz | G06F 16/338 715/234 |
| 2015/0100562 A1 | 4/2015 | Kohlmeier et al. | |
| 2017/0228395 A1* | 8/2017 | Sina | G06F 16/14 |
| 2019/0043258 A1* | 2/2019 | Szymanski | G06F 40/143 |
| 2019/0050384 A1* | 2/2019 | Freundlich | G06F 40/211 |
| 2021/0026878 A1* | 1/2021 | Robert Jose | G10L 21/06 |

* cited by examiner

*Primary Examiner* — William B Partridge
*Assistant Examiner* — Aryan D Toughiry
(74) *Attorney, Agent, or Firm* — Polsinelli PC

(57) ABSTRACT

The present technology addresses the need in the art for an improved technology to display search query results in a space constrained area. The technology pertains to truncating search results in a way that a set of characters used in a search string remains displayed in the search results while other aspects of the search results are truncated.

18 Claims, 4 Drawing Sheets

TRUNCATED SEARCH RESULTS THAT PRESERVE THE MOST RELEVANT PORTIONS

TECHNICAL FIELD

The present technology pertains to displaying truncated search results in a space constrained area, and more specifically pertains to truncating the search results in a way that a set of characters used in a search string remains displayed in the search results while other aspects of the search results are truncated.

BACKGROUND

It is a challenge for those that design computer graphical user interfaces to create a graphical user interface that can do a good job displaying search results in a way that allows the user of the computer to determine the relevance of the search result when it is presented with a list of search results. Part of the challenge is that the content of a search result is variable and so planning for unknown content is difficult. Another part of the challenge is to fit the search results in an area configured to display the search results.

Each search may be subject to different performance limitations too, and those performance limitations might restrain options for displaying the search results. For example, a typical Internet search still requires submitting a query over the Internet and receiving a webpage listing search results. Whereas, a search of locally indexed data might allow possible search results to be displayed dynamically as the user enters the search string. Such a search might be experienced when searching a list of contact names on a mobile device.

BRIEF DESCRIPTION OF THE DRAWINGS

The above-recited and other advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

Figure 1:
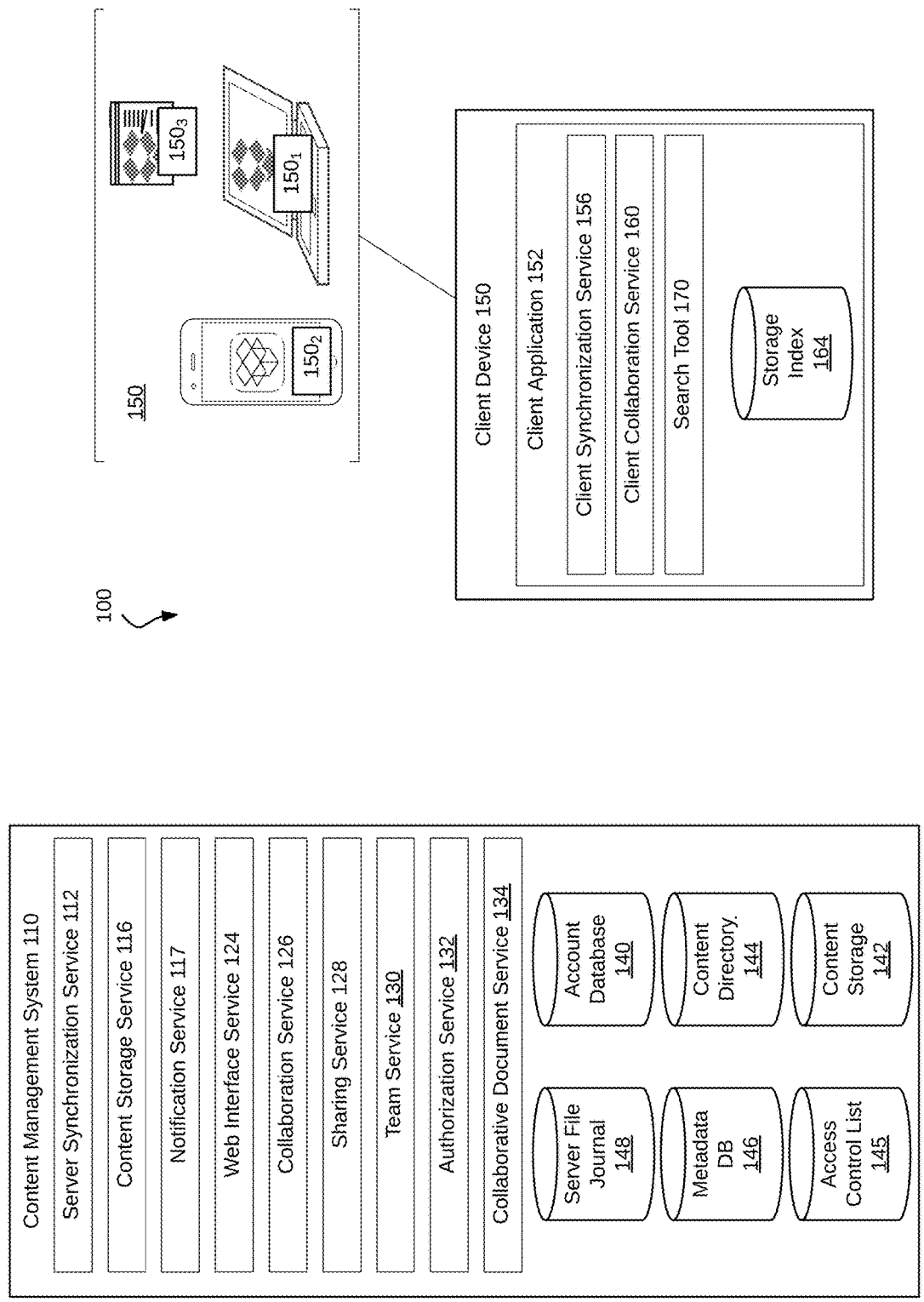
FIG. 1 shows an example of a content management system and client devices in accordance with some aspects of the present technology.

Various examples of the present technology are discussed in detail below. While specific implementations are discussed, it should be understood that this is done for illustration purposes only. A person skilled in the relevant art will recognize that other components and configurations may be used without parting from the spirit and scope of the present technology.

The disclosed technology addresses the need in the art for an improved technology to display search query results in a space constrained area. Several approaches to displaying search results exist, but these technologies either have less space constraints and are therefore able to use available space to show the context for why a search result might be relevant, or these technologies are so space constrained that they do not adequately show context for why a search result might be relevant.

An example of an existing search result technology that has adequate space to show why a search result is relevant can be found in Internet search providers such as GOOGLE, YAHOO, BING, etc. These services provide a snippet from the search result (text from webpages that are deemed relevant and condensed into summary form) and sometimes highlight search terms in the snippet. These technologies have room to display several lines of text in their snippet. In most instances, the snippet remains the same size regardless of whether the webpage gets resized (though text size can be adjusted by the user).

Another example of an existing search result technology that has adequate space to show why a search result is relevant can be found in in document editing applications like WORD, DROPBOX PAPER, etc. These applications return search results as relevant only when the exact characters in the search string are matched in the document that is being searched. These applications return relevant search results in the context in which they appear in the document. Usually several words surrounding the characters in the search string are returned to provide the context. This context can often include twenty different words displayed on several lines in a navigation page displayed next to the document. When the navigation pane is resized, the context provided with the search result can adjust to fit within the navigation pane, but the full context remains visible. For example, the context provided with a search result may fit on two lines in the default width of the navigation pane, but if the navigation pane is reduced in size, the same context will be displayed, even if it may require three or more lines.

An example of a search result technology that does not have adequate space to show why a search result is relevant can be found in a file browser interface such as WINDOWS EXPLORER, APPLE FINDER, etc. or in a search interface in an email application such as OUTLOOK, etc. These technologies will display the search results as best as possible given the amount of space available. They do not typically choose what portions of a relevant search result to display based on the search string, but in some instances, if the search string does happen to be in the displayed portion then the search string may be highlighted. For example, a file browser interface typically will display the file name of any file deemed relevant to the search result. If the characters in the search string that make that file relevant are at the end of the file name, or embedded in the file, those characters will not be displayed in the search results. Similarly, when searching an email application, the relevant emails will be displayed according to the format of the email application. If the characters in the search string are embedded in the email, or are at the end of a subject line, those characters will not be displayed in the search results. Often these interfaces are resizable and the applications will display additional content when the available room to display a file name or email identifier is greater, and will display less content when there is less room. There is no consideration given to preserving the display of a portion of the content that matches the characters in the search string.

Some search result technologies that do not have adequate space to show why a search result is relevant utilize a cascading style sheet (CSS) flexbox. A flexbox is a dynamically resizable box that can grow or shrink to accommodate the amount of space it has available. It can also truncate the text contents within the flexbox as necessary. However the truncation performed by the flexbox (or the application rendering the content) does not take into account what portions of the content in the flexbox are most relevant. Therefore, even when characters within a search string appear in content that could be displayed within a flexbox, the flexbox may hide those characters when truncating the content to fit the available space.

The present technology provides advantages associated with the existing search result technologies that have adequate space to show why a search result is relevant in a user interface that is space constrained.

As used herein the phrases "space constrained" or "constrained space" refer to an area in a graphical user interface that requires at least one search result to be truncated because the at least one search result will not fit within the constrained space. The truncation can include cutting off the front of a search result, the end of a search result, and/or a middle portion of a search result. In some embodiments, the portions that have been cut off/out of a search result can be replaced by a symbol such as an ellipses ( . . . ) or wildcard symbols ($, ?, ~, etc.). In some embodiments, the constrained space is limited to a maximum number of characters per line, and each result can occupy a limited number of lines.

The present technology is relevant to any search result technology that truncates at least one search result.

In some embodiments, the present technology pertains to a space constrained search interface that can exist in a side pane of a browser (a file browser application, or a web browser application). In some embodiments, the present technology pertains to a space constrained search interface present in a mobile application.

In some embodiments, the present technology can be used to search for content items in a content management system. In some embodiments, the present technology can be used to search for users having shared access to a content item in the content management system. In some embodiments, the present technology can be used to search for a user having shared access to a content management system and where the relevant user is available for contacting through one or more communication services, including third party services.

In some embodiments, the disclosed technology is deployed in the context of a content management system having content item synchronization capabilities and collaboration features, among others. An example system configuration 100 is shown in FIG. 1, which depicts content management system 110 interacting with client device 150.

Accounts

Content management system 110 can store content items in association with accounts, as well as perform a variety of content item management tasks, such as retrieve, modify, browse, and/or share the content item(s). Furthermore, content management system 110 can enable an account to access content item(s) from multiple client devices.

Content management system 110 supports a plurality of accounts. An entity (user, group of users, team, company, etc.) can create an account with content management system, and account details can be stored in account database 140. Account database 140 can store profile information for registered entities. In some cases, profile information for registered entities includes a username and/or email address. Account database 140 can include account management information, such as account type (e.g. various tiers of free or paid accounts), storage space allocated, storage space used, client devices 150 having a registered content management client application 152 resident thereon, security settings, personal configuration settings, etc.

Account database 140 can store groups of accounts associated with an entity. Groups can have permissions based on group policies and/or access control lists, and members of the groups can inherit the permissions. For example, a marketing group can have access to one set of content items while an engineering group can have access to another set of content items. An administrator group can modify groups, modify user accounts, etc.

Content Item Storage

A feature of content management system 110 is the storage of content items, which can be stored in content storage 142. Content items can be any digital data such as documents, collaboration content items, text files, audio files, image files, video files, webpages, executable files, binary files, etc. A content item can also include collections or other mechanisms for grouping content items together with different behaviors, such as folders, zip files, playlists, albums, etc. A collection can refer to a folder, or a plurality of content items that are related or grouped by a common attribute. In some embodiments, content storage 142 is combined with other types of storage or databases to handle specific functions. Content storage 142 can store content items, while metadata regarding the content items can be stored in metadata database 146. Likewise, data regarding where a content item is stored in content storage 142 can be stored in content directory 144. Additionally, data regarding changes, access, etc. can be stored in server file journal 148. Each of the various storages/databases such as content storage 142, content directory 144, server file journal 148, and metadata database 146 can be comprised of more than one such storage or database and can be distributed over many devices and locations. Other configurations are also possible. For example, data from content storage 142, content directory 144, server file journal 148, and/or metadata database 146 may be combined into one or more content storages or databases or further segmented into additional content storages or databases. Thus, content management system 110 may include more or less storages and/or databases than shown in FIG. 1.

In some embodiments, content storage 142 is associated with at least one content storage service 116, which includes software or other processor executable instructions for managing the storage of content items including, but not limited to, receiving content items for storage, preparing content items for storage, selecting a storage location for the content item, retrieving content items from storage, etc. In some embodiments, content storage service 116 can divide a content item into smaller chunks for storage at content storage 142. The location of each chunk making up a content item can be recorded in content directory 144. Content directory 144 can include a content entry for each content item stored in content storage 142. The content entry can be associated with a unique ID, which identifies a content item.

In some embodiments, the unique ID, which identifies a content item in content directory 144, can be derived from a deterministic hash function. This method of deriving a unique ID for a content item can ensure that content item duplicates are recognized as such since the deterministic hash function will output the same identifier for every copy of the same content item, but will output a different identifier for a different content item. Using this methodology, content storage service 116 can output a unique ID for each content item.

Content storage service 116 can also designate or record a content path for a content item in metadata database 146. The content path can include the name of the content item and/or folder hierarchy associated with the content item. For example, the content path can include a folder or path of folders in which the content item is stored in a local file system on a client device. While content items are stored in content storage 142 in blocks and may not be stored under a tree like directory structure, such directory structure is a comfortable navigation structure for users. Content storage service 116 can define or record a content path for a content item wherein the "root" node of a directory structure can be a namespace for each account. Within the namespace can be a directory structure defined by a user of an account and/or content storage service 116. Metadata database 146 can store the content path for each content item as part of a content entry.

In some embodiments, the namespace can include additional namespaces nested in the directory structure as if they are stored within the root node. This can occur when an account has access to a shared collection. Shared collections can be assigned their own namespace within content management system 110. While some shared collections are actually a root node for the shared collection, they are located subordinate to the account namespace in the directory structure, and can appear as a folder within a folder for the account. As addressed above, the directory structure is merely a comfortable navigation structure for users, but does not correlate to storage locations of content items in content storage 142.

While the directory structure in which an account views content items does not correlate to storage locations at content management system 110, the directory structure can correlate to storage locations on client device 150 depending on the file system used by client device 150.

As addressed above, a content entry in content directory 144 can also include the location of each chunk making up a content item. More specifically, the content entry can include content pointers that identify the location in content storage 142 of the chunks that make up the content item.

In addition to a content path and content pointer, a content entry in content directory 144 can also include a user account identifier that identifies the user account that has access to the content item and/or a group identifier that identifies a group with access to the content item and/or a namespace to which the content entry belongs.

Content storage service 116 can decrease the amount of storage space required by identifying duplicate content items or duplicate blocks that make up a content item or versions of a content item. Instead of storing multiple copies, content storage 142 can store a single copy of the content item or block of the content item and content directory 144 can include a pointer or other mechanism to link the duplicates to the single copy.

Content storage service 116 can also store metadata describing content items, content item types, folders, file path, and/or the relationship of content items to various accounts, collections, or groups in metadata database 146, in association with the unique ID of the content item.

Content storage service 116 can also store a log of data regarding changes, access, etc. in server file journal 148. Server file journal 148 can include the unique ID of the content item and a description of the change or access action along with a time stamp or version number and any other relevant data. Server file journal 148 can also include pointers to blocks affected by the change or content item access. Content storage service can provide the ability to undo operations, by using a content item version control that tracks changes to content items, different versions of content items (including diverging version trees), and a change history that can be acquired from the server file journal 148.

Content Item Synchronization

Another feature of content management system 110 is synchronization of content items with at least one client device 150. Client device(s) can take different forms and have different capabilities. For example, client device 150₁ is a computing device having a local file system accessible by multiple applications resident thereon. Client device 150₂ is a computing device wherein content items are only accessible to a specific application or by permission given by the specific application, and the content items are typically stored either in an application specific space or in the cloud. Client device 150₃ is any client device accessing content management system 110 via a web browser and accessing content items via a web interface. While example client devices 150₁, 150₂, and 150₃ are depicted in form factors such as a laptop, mobile device, or web browser, it should be understood that the descriptions thereof are not limited to devices of these example form factors. For example a mobile device such as client 150₂ might have a local file system accessible by multiple applications resident thereon, or client 150₂ might access content management system 110 via a web browser. As such, the form factor should not be considered limiting when considering client 150's capabilities. One or more functions described herein with respect to client device 150 may or may not be available on every client device depending on the specific capabilities of the device—the file access model being one such capability.

In many embodiments, client devices are associated with an account of content management system 110, but In some embodiments, client devices can access content using shared links and do not require an account.

As noted above, some client devices can access content management system 110 using a web browser. However, client devices can also access content management system 110 using client application 152 stored and running on client device 150. Client application 152 can include a client synchronization service 156.

Client synchronization service 156 can be in communication with server synchronization service 112 to synchronize changes to content items between client device 150 and content management system 110.

Client device 150 can synchronize content with content management system 110 via client synchronization service 156. The synchronization can be platform agnostic. That is, content can be synchronized across multiple client devices of varying type, capabilities, operating systems, etc. Client synchronization service 156 can synchronize any changes (new, deleted, modified, copied, or moved content items) to content items in a designated location of a file system of client device 150.

Content items can be synchronized from client device 150 to content management system 110, and vice versa. In embodiments wherein synchronization is from client device 150 to content management system 110, a user can manipulate content items directly from the file system of client device 150, while client synchronization service 156 can monitor directory on client device 150 for changes to files within the monitored folders.

When client synchronization service 156 detects a write, move, copy, or delete of content in a directory that it monitors, client synchronization service 156 can synchronize the changes to content management storage service 116. In some embodiments, client synchronization service 156 can perform some functions of content management storage service 116 including functions addressed above such as dividing the content item into blocks, hashing the content item to generate a unique identifier, etc. Client synchronization service 156 can index content within client storage index 164 and save the result in storage index 164. Indexing can include storing paths plus a unique server identifier, and a unique client identifier for each content item. In some embodiments, client synchronization service 156 learns the unique server identifier from server synchronization service 112, and learns the unique client identifier from the operating system of client device 150.

Client synchronization service 156 can use storage index 164 to facilitate the synchronization of at least a portion of the content within client storage with content associated with a user account on content management system 110. For example, client synchronization service 156 can compare storage index 164 with content management system 110 and detect differences between content on client storage and content associated with a user account on content management system 110. Client synchronization service 156 can then attempt to reconcile differences by uploading, downloading, modifying, and deleting content on client storage as appropriate. Content storage service 116 can store the changed or new block for the content item and update server file journal 148, metadata database 146, content directory 144, content storage 142, account database 140, etc. as appropriate.

When synchronizing from content management system 110 to client device 150, a mount, modification, addition, deletion, move of a content item recorded in server file journal 148 can trigger a notification to be sent to client device 150 using notification service 117. When client device 150 is informed of the change a request changes listed in server file journal 148 since the last synchronization point known to the client device. When client device 150 determines that it is out of synchronization with content management system 110, client synchronization service 156 requests content item blocks including the changes, and updates its local copy of the changed content items.

In some embodiments, storage index 164 stores tree data structures wherein one tree reflects the latest representation of a directory according to server synchronization service 112, while another tree reflects the latest representation of the directory according to client synchronization service 156. Client synchronization service can work to ensure that the tree structures match by requesting data from server synchronization service 112 or committing changes on client device 150 to content management system 110.

Sometimes client device 150 might not have a network connection available. In this scenario, client synchronization service 156 can monitor the linked collection for content item changes and queue those changes for later synchronization to content management system 110 when a network connection is available. Similarly, a user can manually start, stop, pause, or resume synchronization with content management system 110.

Client synchronization service 156 can synchronize all content associated with a particular user account on content management system 110. Alternatively, client synchronization service 156 can selectively synchronize a portion of the content of the total content associated with the particular user account on content management system 110. Selectively synchronizing only a portion of the content can preserve space on client device 150 and save bandwidth.

In some embodiments, client synchronization service 156 selectively stores a portion of the content associated with the particular user account and stores placeholder content items in client storage for the remainder portion of the content. For example, client synchronization service 156 can store a placeholder content item that has the same filename, path, extension, metadata, of its respective complete content item on content management system 110, but lacking the data of the complete content item. The placeholder content item can be a few bytes or less in size while the respective complete content item might be significantly larger. After client device 150 attempts to access the content item, client synchronization service 156 can retrieve the data of the content item from content management system 110 and provide the complete content item to accessing client device 150. This approach can provide significant space and bandwidth savings while still providing full access to a user's content on content management system 110.

Collaboration Features

Another feature of content management system 110 is to facilitate collaboration between users. Collaboration features include content item sharing, commenting on content items, co-working on content items, instant messaging, providing presence and seen state information regarding content items, etc.

Sharing

Content management system 110 can manage sharing content via sharing service 128. Sharing content by providing a link to the content can include making the content item accessible from any computing device in network communication with content management system 110. However, In some embodiments, a link can be associated with access restrictions enforced by content management system 110 and access control list 145. Sharing content can also include linking content using sharing service 128 to share content within content management system 110 with at least one additional user account (in addition to the original user account associated with the content item) so that each user account has access to the content item. The additional user account can gain access to the content by accepting the content, which will then be accessible through either web interface service 124 or directly from within the directory structure associated with their account on client device 150. The sharing can be performed in a platform agnostic manner. That is, the content can be shared across multiple client devices 150 of varying type, capabilities, operating systems, etc. The content can also be shared across varying types of user accounts.

To share a content item within content management system 110 sharing service 128 can add a user account identifier or multiple user account identifiers to a content entry in access control list database 145 associated with the content item, thus granting the added user account access to the content item. Sharing service 128 can also remove user account identifiers from a content entry to restrict a user account's access to the content item. Sharing service 128 can record content item identifiers, user account identifiers given access to a content item, and access levels in access control list database 145. For example, in some embodiments, user account identifiers associated with a single content entry can specify different permissions for respective user account identifiers with respect to the associated content item.

To share content items outside of content management system 110, sharing service 128 can generate a custom network address, such as a uniform resource locator (URL), which allows any web browser to access the content item or collection in content management system 110 without any authentication. To accomplish this, sharing service 128 can include content identification data in the generated URL, which can later be used to properly identify and return the requested content item. For example, sharing service 128 can include the account identifier and the content path or a content item identifying code in the generated URL. Upon selection of the URL, the content identification data included in the URL can be transmitted to content management system 110, which can use the received content identification data to identify the appropriate content item and return the content item.

In addition to generating the URL, sharing service 128 can also be configured to record in access control list database 145 that a URL to the content item has been created. In some embodiments, the content entry associated with a content item can include a URL flag indicating whether a URL to the content item has been created. For example, the URL flag can be a Boolean value initially set to 0 or false to indicate that a URL to the content item has not been created. Sharing service 128 can change the value of the flag to 1 or true after generating a URL to the content item.

In some embodiments, sharing service 128 can associate a set of permissions to a URL for a content item. For example, if a user attempts to access the content item via the URL, sharing service 128 can provide a limited set of permissions for the content item. Examples of limited permissions include restrictions that the user cannot download the content item, save the content item, copy the content item, modify the content item, etc. In some embodiments, limited permissions include restrictions that only permit a content item to be accessed from with a specified domain, i.e., from within a corporate network domain, or by accounts associated with a specified domain, e.g., accounts associated with a company account (e.g., @acme.com).

In some embodiments, sharing service 128 can also be configured to deactivate a generated URL. For example, each content entry can also include a URL active flag indicating whether the content should be returned in response to a request from the generated URL. For example, sharing service 128 can only return a content item requested by a generated link if the URL active flag is set to 1 or true. Thus, access to a content item for which a URL has been generated can be easily restricted by changing the value of the URL active flag. This allows a user to restrict access to the shared content item without having to move the content item or delete the generated URL. Likewise, sharing service 128 can reactivate the URL by again changing the value of the URL active flag to 1 or true. A user can thus easily restore access to the content item without the need to generate a new URL.

In some embodiments, content management system 110 can designate a URL for uploading a content item. For example, a first user with a user account can request such a URL, provide the URL to a contributing user and the contributing user can upload a content item to the first user's user account using the URL.

Team Service

In some embodiments, content management system 110 includes team service 130. Team service 130 can provide functionality for creating and managing defined teams of user accounts. Teams can be created for a company, with sub-teams (e.g., business units, or project teams, etc.), and user accounts assigned to teams and sub-teams, or teams can be created for any defined group of user accounts. Teams service 130 can provide a common shared space for the team, private user account folders, and access limited shared folders. Teams service can also provide a management interface for an administrator to manage collections and content items within team, and can manage user accounts that are associated with the team.

Authorization Service

In some embodiments, content management system 110 includes authorization service 132. Authorization service 132 ensures that a user account attempting to access a namespace has appropriate rights to access the namespace. Authorization service 132 can receive a token from client application 152 that follows a request to access a namespace and can return the capabilities permitted to the user account. For user accounts with multiple levels of access (e.g. a user account with user rights and administrator rights) authorization service 132 can also require explicit privilege escalation to avoid unintentional actions by administrators.

Presence and Seen State

In some embodiments, content management system can provide information about how users with which a content item is shared are interacting or have interacted with the content item. In some embodiments, content management system 110 can report that a user with which a content item is shared is currently viewing the content item. For example, client collaboration service 160 can notify notifications service 117 when client device 150 is accessing the content item. Notifications service 117 can then notify all client devices of other users having access to the same content item of the presence of the user of client device 150 with respect to the content item.

In some embodiments, content management system 110 can report a history of user interaction with a shared content item. Collaboration service 126 can query data sources such as metadata database 146 and server file journal 148 to determine that a user has saved the content item, that a user has yet to view the content item, etc., and disseminate this status information using notification service 117 to other users so that they can know who currently is or has viewed or modified the content item.

Collaboration service 126 can facilitate comments associated with content, even if a content item does not natively support commenting functionality. Such comments can be stored in metadata database 146.

Collaboration service 126 can originate and transmit notifications for users. For example, a user can mention another user in a comment and collaboration service 126 can send a notification to that user that he has been mentioned in the comment. Various other content item events can trigger notifications, including deleting a content item, sharing a content item, etc.

Collaboration service 126 can provide a messaging platform whereby users can send and receive instant messages, voice calls, emails, etc.

Collaboration Content Items

In some embodiments, content management service can also include Collaborative document service 134 which can provide an interactive content item collaboration platform whereby users can simultaneously create collaboration content items, comment in the collaboration content items, and manage tasks within the collaboration content items. Collaboration content items can be files that users can create and edit using a collaboration content item editor, and can contain collaboration content item elements. Collaboration content item elements may include a collaboration content item identifier, one or more author identifiers, collaboration content item text, collaboration content item attributes, interaction information, comments, sharing users, etc. Collaboration content item elements can be stored as database entities, which allows for searching and retrieving the collaboration content items. Multiple users may access, view, edit, and collaborate on collaboration content items at the same time or at different times. In some embodiments, this can be managed by requiring two users access a content item through a web interface and there they can work on the same copy of the content item at the same time.

Collaboration Companion Interface

In some embodiments, client collaboration service 160 can provide a native application companion interface for the purpose of displaying information relevant to a content item being presented on client device 150. In embodiments wherein a content item is accessed by a native application stored and executed on client device 150, where the content item is in a designated location of the file system of client device 150 such that the content item is managed by content application 152, the native application may not provide any native way to display the above addressed collaboration data. In such embodiments, client collaboration service 160 can detect that a user has opened a content item, and can provide an overlay with additional information for the content item, such as collaboration data. For example, the additional information can include comments for the content item, status of the content item, activity of other users previously or currently viewing the content item. Such an overlay can warn a user that changes might be lost because another user is currently editing the content item.

In some embodiments, one or more of the services or storages/databases discussed above can be accessed using public or private application programming interfaces.

Certain software applications can access content storage 142 via an API on behalf of a user. For example, a software package such as an application running on client device 150, can programmatically make API calls directly to content management system 110 when a user provides authentication credentials, to read, write, create, delete, share, or otherwise manipulate content.

A user can view or manipulate content stored in a user account via a web interface generated and served by web interface service 124. For example, the user can navigate in a web browser to a web address provided by content management system 110. Changes or updates to content in the content storage 142 made through the web interface, such as uploading a new version of a content item, can be propagated back to other client devices associated with the user's account. For example, multiple client devices, each with their own client software, can be associated with a single account and content items in the account can be synchronized between each of the multiple client devices.

Client device 150 can connect to content management system 110 on behalf of a user. A user can directly interact with client device 150, for example when client device 150 is a desktop or laptop computer, phone, television, internet-of-things device, etc. Alternatively or additionally, client device 150 can act on behalf of the user without the user having physical access to client device 150, for example when client device 150 is a server.

Some features of client device 150 are enabled by an application installed on client device 150. In some embodiments, the application can include a content management system specific component. For example, the content management system specific component can be a stand-alone application 152, one or more application plug-ins, and/or a browser extension. However, the user can also interact with content management system 110 via a third-party application, such as a web browser, that resides on client device 150 and is configured to communicate with content management system 110. In various implementations, the client-side application 152 can present a user interface (UI) for a user to interact with content management system 110. For example, the user can interact with the content management system 110 via a file system explorer integrated with the file system or via a webpage displayed using a web browser application.

In some embodiments, client application 152 can be configured to manage and synchronize content for more than one account of content management system 110. In such embodiments client application 152 can remain logged into multiple accounts and provide normal services for the multiple accounts. In some embodiments, each account can appear as folder in a file system, and all content items within that folder can be synchronized with content management system 110. In some embodiments, client application 152 can include a selector to choose one of the multiple accounts to be the primary account or default account.

In some embodiments, client application 152 includes search tool 170. Search tool 170 is configured to search for content items associated with the user account, and/or other users with whom content items may be shared. In some embodiments, search tool 170 can search third party services to identify the users with whom content items may be shared so that the users can be interacted with using the third-party services.

While not shown, search tool 170 can also be incorporated into web interface service 124.

While content management system 110 is presented with specific components, it should be understood by one skilled in the art, that the architectural configuration of system 100 is simply one possible configuration and that other configurations with more or fewer components are possible. Further, a service can have more or less functionality, even including functionality described as being with another service. Moreover, features described herein with respect to an embodiment can be combined with features described with respect to another embodiment.

While system 100 is presented with specific components, it should be understood by one skilled in the art, that the architectural configuration of system 100 is simply one possible configuration and that other configurations with more or fewer components are possible.

In some embodiments, the present technology pertains to a space constrained search interface that can exist in a side pane of a browser (a file browser application, or a web browser application). In some embodiments, the present technology pertains to a space constrained search interface present in a mobile application.

In some embodiments, the present technology can be used to search for content items in a content management system. In some embodiments, the present technology can be used to search for users having shared access to a content item in the content management system. In some embodiments, the present technology can be used to search for a user having shared access to a content management system and where the relevant user is available for contacting through one or more communication services, including third party services.

Figure 2:
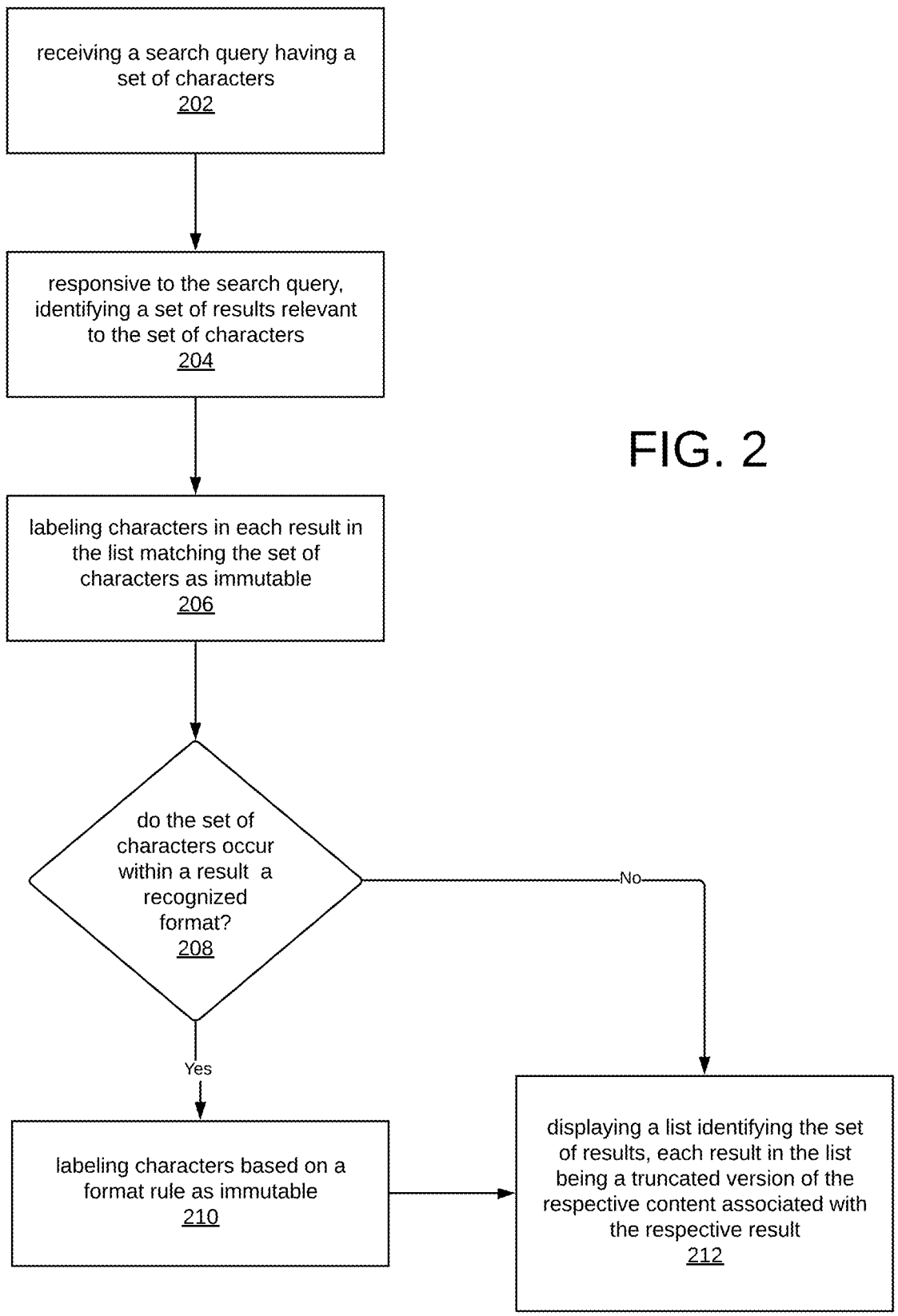
FIG. 2 shows an example method embodiment in accordance with some aspects of the present technology.

FIG. 2 illustrates an example method for displaying search results in a space constrained search interface. The method illustrated in FIG. 2 begins when a user initiates a search using search tool 170 of client application 152. Search tool 170 can receive (202) a search query having a set of characters. In response to the search query, search tool 170 can identify (204) a set of results relevant to the set of characters in the search query.

Search tool 170 can then label (206) characters in each search result in the list matching the set of characters included in the search query as immutable. Labeling (206) characters as immutable in each search result that matched a set of characters included in the search query ensures that when the search result is displayed the immutable characters will not be truncated.

In some embodiments, search tool 170 can also highlight or format characters in each search result that match the set of characters included in search query.

As used herein, labeling characters or applying a format such as highlighting, bolding or underlying, etc., can refer to designating some characteristic of a character in a markup language such as HTML or XML or complementary language like CSS. In a most general usage, labeling or formatting a character refers to providing an attribute to a character.

In some embodiments, in addition to the set of characters in the search query, search tool 170 can also label some characters surrounding the set of characters from the search query as immutable. For example, search tool 170 can be configured to identify the most relevant part of the search results (the set of characters included in the query) and identify additional characters surrounding the most relevant part of the search results to provide context. Collectively all of these characters can be labeled as immutable.

In some embodiments, context for why the search result is relevant can come from the fact that the search results occur in a recognized format. For example, the set of characters included in the query might occur in a phone number, a URL, an email address, a hashtag, an @ mention, etc. When search tool 170 determines (208) that the search results occur in a recognized format, search tool 170 can be configured to label (210) characters in the search result that identify the recognized format as immutable.

For example, when the set of characters included in the query occurs in an email address, search tool 170 can identify the @ and a portion of the domain as immutable. Or, when the set of characters included in the query occurs in a URL, search tool 170 can identify a portion of the domain and the domain suffix (.com, .org, .edu, etc.). When the set of characters included in the query occurs in a hashtag, search tool 170 can identify the # as immutable.

After search tool 170 has labeled the set of characters from the search as immutable and any other characters that are helpful to provide context as immutable, search tool 170 can display (212) a list of search results wherein each result in the list is a truncated version of the content associated with the respective search results. These truncated versions can be shortened as much is needed to fit within the constrained area except that any immutable characters cannot be truncated and must be displayed.

In some embodiments, the search results become displayed by providing a list of characters to a browser or application to be rendered. Each character, or range of characters in the search result can be identified as immutable or as able to be truncated. Additionally, any formatting like highlighting or bolding of characters is also identified. The browser or application will then display the search result according to the identification of each character or range of characters. Thereby, any characters that are immutable are displayed, and characters available for truncating might or might not be displayed. The browser or application will select characters from those that can be truncated and truncate them as needed.

The mechanism of identifying characters as immutable or able to be truncated enables the use of flexboxes to display the search results. A flexbox is a particular CSS (cascading style sheet) object that can have its size be dynamically adjusted. When a user interface is made larger or smaller, the browser or application can select more or less characters to be truncated from the characters that have been designated as available for truncating. In this way, search results can be presented in one or more flexboxes and the search results can be made to use the available area.

In some embodiments, so many characters might be labeled as immutable that not all of them can be displayed. In such embodiments the characters can scroll to reveal characters that could not initially be displayed.

Figure 3:
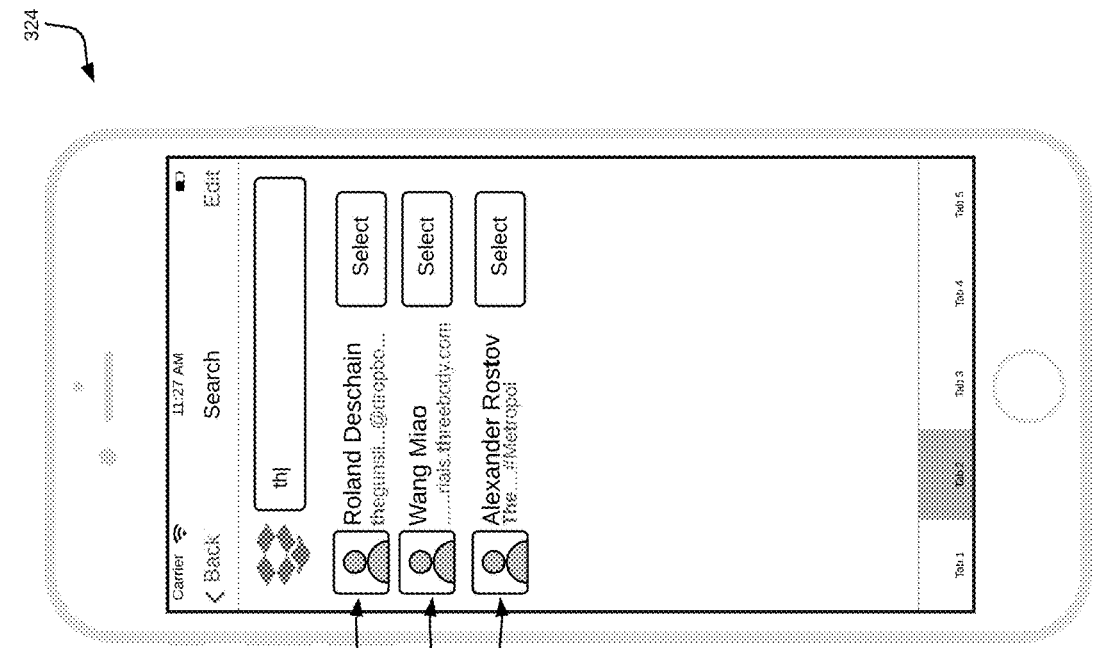
FIG. 3 shows an example graphical user interface embodiment in accordance with some aspects of the present technology.
Figure 3:
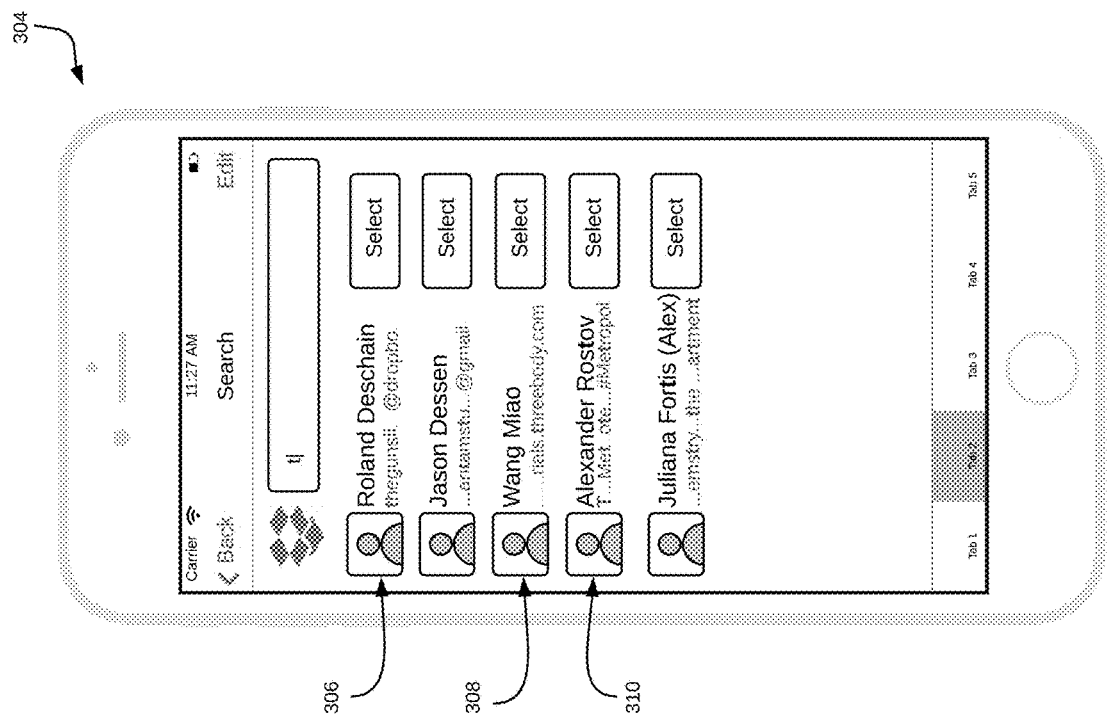

FIG. 3 shows an example space constrained user interface wherein search tool 170 can receive a search query and can display the search results.

On the left, image 304 shows the search tool receiving a first character "t" in the search query. In some embodiments, as soon as the first character is entered search tool 170 can begin to populate relevant search results. In the search results shown in image 304 the character "t" has been labeled immutable and has been bolded to highlight its presence. As illustrated in image 304 all of the search results include truncation in order to fit in the user interface. However, the character "t" remains visible in each search result.

As addressed above, in some embodiments, search tool 170 can recognize that the search result occurs in a recognized format. Search result 306 can be recognized as an email address. Therefore, while the character "t" does not occur in the portion of the search result "@dropbox.com," a portion of these characters has been labeled immutable to provide additional context.

Search result 308 can be recognized as a web URL. Therefore, while the character "t" does not occur in the portion of the search result ".com," a portion of these characters has been labeled immutable to provide additional context.

Search results 310 can be recognized as including a hashtag. Therefore, while the character "t" does not occur in the hashtag portion of the search result "#," this character has been labeled immutable to provide additional context.

On the right, image 324 shows the search receiving a second character "h" yielding a current search string of "th". The addition of the second character has reduced the number of relevant search results, and has adjusted how the truncation of some of the search results, for example search result 330 is displayed.

It should be appreciated that there is not limit to the number of groupings of immutable characters. In some embodiments, all characters in search results matching the set of characters in the search query can be labeled immutable regardless of whether they appears in two or more groupings.

While the present disclosure has thus far referred to relevant characters as being limited to those characters that occur in the search string, it should be appreciated that there are other mechanisms to determine relevant characters. In some embodiments, search tool 170 can identify characters other than those in the search string as relevant and make those characters immutable instead of, or in addition to, the characters in the search string. For example, when the search string spells a word, synonyms can be considered relevant.

In some embodiments, search tool 170 can decide to not display some characters even if they appear in the search string. In such embodiments, search tool 170 might identify that these characters occur in less important parts of speech like articles, and instead can prefer characters occurring in nouns or verbs, or in recognized formats. In some embodiments, search tool 170 might recognize that the characters appear multiple times in the same word, which repeats in the search result. In such embodiments, search tool 170 may not identify every occurrence of the characters to be immutable in the search string.

In some embodiments, machine learning can be used to identify immutable characters, including relevant characters, and those characters provided for context.

In addition to labeling some characters as immutable, in some embodiments, search tool 170 can identify some characters to always be truncated or to be preferred characters for truncation. In such embodiments, search tool 170 might recognize some characters as irrelevant or redundant and can mark these characters to be truncated.

In some embodiments, additional information might be helpful to the user which can't be displayed in the available amount of space. For example, when searching multiple databases at once, it could be helpful to display which database or source the search result comes from. This additional information could be displayed when a user hovers over a single search result. In some embodiments, the selection button could be replaced by an icon showing the source of the search result and/or an action that can be taken by the source if selected.

In some embodiments, such as when searching to identify a contact that might be available through more than one service, search tool 170 can identify that multiple search results pertain to the same person. In such embodiments, the search tool 170 can highlight search results for services where the person is currently reachable, when such information is available from the service.

In some embodiments, search tool 170 can identify that multiple search results pertain to the same person, and can combine multiple results into one search result to save room for other search results.

Figure 4:
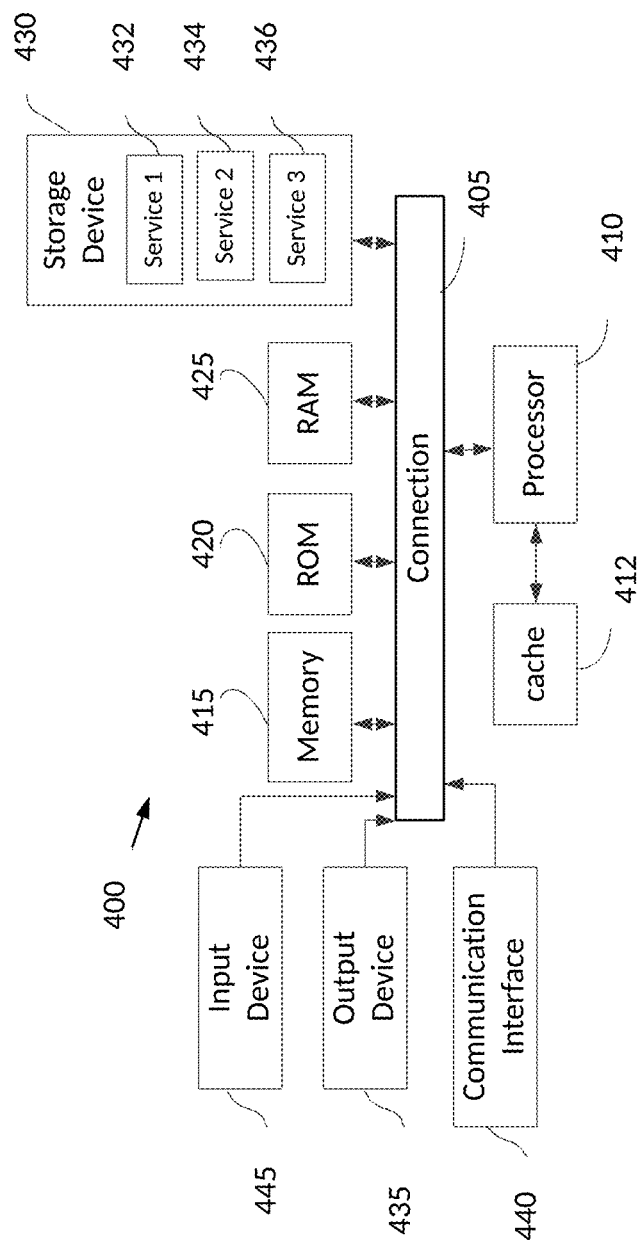
FIG. 4 shows an example of a system for implementing certain aspects of the present technology.

FIG. 4 shows an example of computing system 400, which can be for example any computing device making up client device 150, content management system 110 or any component thereof in which the components of the system are in communication with each other using connection 405. Connection 405 can be a physical connection via a bus, or a direct connection into processor 410, such as in a chipset architecture. Connection 405 can also be a virtual connection, networked connection, or logical connection.

In some embodiments, computing system 400 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

Example system 400 includes at least one processing unit (CPU or processor) 410 and connection 405 that couples various system components including system memory 415, such as read only memory (ROM) 420 and random access memory (RAM) 425 to processor 410. Computing system 400 can include a cache of high-speed memory 412 connected directly with, in close proximity to, or integrated as part of processor 410.

Processor 410 can include any general purpose processor and a hardware service or software service, such as services 432, 434, and 436 stored in storage device 430, configured to control processor 410 as well as a special-purpose processor where software instructions are incorporated into the actual processor design. Processor 410 may essentially be a completely self-contained computing system, containing multiple cores or processors, a bus, memory controller, cache, etc. A multi-core processor may be symmetric or asymmetric.

To enable user interaction, computing system 400 includes an input device 445, which can represent any number of input mechanisms, such as a microphone for speech, a touch-sensitive screen for gesture or graphical input, keyboard, mouse, motion input, speech, etc. Computing system 400 can also include output device 435, which can be one or more of a number of output mechanisms known to those of skill in the art. In some instances, multimodal systems can enable a user to provide multiple types of input/output to communicate with computing system 400. Computing system 400 can include communications interface 440, which can generally govern and manage the user input and system output. There is no restriction on operating on any particular hardware arrangement and therefore the basic features here may easily be substituted for improved hardware or firmware arrangements as they are developed.

Storage device 430 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 430 can include software services, servers, services, etc., that when the code that defines such software is executed by the processor 410, it causes the system to perform a function. In some embodiments, a hardware service that performs a particular function can include the software component stored in a computer-readable medium in connection with the necessary hardware components, such as processor 410, connection 405, output device 435, etc., to carry out the function.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A method comprising:
receiving a search query having a set of characters;
responsive to the search query, identifying a set of results relevant to the set of characters, each result being relevant to the set of characters based on the set of characters being in content associated with a respective result;
identifying, for search results in the set of results, a format of a string that includes the set of characters determined to occur within a recognized format that corresponds to a function for the string, and determining adjacent characters that are adjacent to characters matching the search query to display based on the format for a respective search result in the set of search results;
labeling the set of characters and the adjacent characters immutable; and
displaying the respective search result in the set of search results in a dynamically resizable field, that is adjustable to fit a constrained space, the search results displayed in the dynamically resizable field being a truncated version of respective content associated with the respective search result, the truncated version maintaining:
the set of characters;
at least one additional character sufficient to allow the recognized format to remain recognizable in addition to the set of characters, wherein the at least one additional character is not adjacent to the characters matching the search query; and
the adjacent characters labeled as immutable.

2. The method of claim 1, wherein a browser resizes the dynamically resizable field subject to an amount of space available for the dynamically resizable field and creates the truncated version to accommodate an available amount of space in the dynamically resizable field in which to provide the respective result, subject to the immutable label requiring the set of characters relevant to the respective results to be displayed.

3. The method of claim 1, wherein the list identifying the set of results is displayed in a constrained space that is limited to a maximum number of characters per line, and each result can occupy a limited number of lines.

4. The method of claim 1, wherein the truncated version of the respective content includes a least a first text portion and second text portion of each result interrupted by truncated portions, wherein at least one of the first text portion or the second text portion includes the set of characters.

5. The method of claim 1, wherein the dynamically resizable field is a flexbox, the flexbox is under the control of a browser and is configured to truncate any character other than the set of characters and the adjacent characters labeled as immutable in order to resize the results to fit the size of the flexbox, wherein the flexbox can be dynamically resized as a window containing the browser is resized or a field containing the flexbox is resized.

6. The method of claim 1, wherein the displaying the truncated version includes maintaining at least one additional character proximate to the set of characters in addition to the set of characters.

7. A non-transitory computer readable medium comprising instructions stored thereon, the instructions, when executed, being effective to cause at least one processor to:
receive a search query having a set of characters;
responsive to the search query, identify a set of results relevant to the set of characters;
identify, for search result in the set of results, a format of a string that includes the set of characters determined to occur within a recognized format that corresponds to a function for the string, and determining adjacent characters that are adjacent to characters matching the search query to display based on the format for a respective search result in the set of search results;
label the set of characters and the adjacent characters immutable; and
display the respective search result in the set of search results in a dynamically resizable field, that is adjustable to fit a constrained space, the search results displayed in the dynamically resizable field being a truncated version of respective content associated with the respective search result, the truncated version maintaining:

the set of characters;
at least one additional character sufficient to allow the recognized format to remain recognizable in addition to the set of characters, wherein the at least one additional character is not adjacent to the characters matching the search query; and
the adjacent characters labeled as immutable.

8. The non-transitory computer readable medium of claim 7, wherein the instructions, when executed, being effective to cause the at least one processor to:
wherein a browser resizes the dynamically resizable field subject to an amount of space available for the dynamically resizable field and creates the truncated version to accommodate an available amount of space in the dynamically resizable field in which to provide the respective result, subject to the immutable label requiring the plurality of characters relevant to the respective results to be displayed.

9. The non-transitory computer readable medium of claim 7, wherein the list identifying the set of results is displayed in a constrained space that is limited to a maximum number of characters per line, and each result can occupy a limited number of lines.

10. The non-transitory computer readable medium of claim 7, wherein the truncated version of the respective content includes a least a first text portion and second text portion of each result interrupted by truncated portions, wherein at least one of the first text portion or the second text portion includes the plurality of characters.

11. The non-transitory computer readable medium of claim 7, wherein the dynamically resizable field is a flexbox, the flexbox is under the control of a browser and is configured to truncate any character other than the set of characters and the adjacent characters labeled as immutable in order to resize the results to fit the size of the flexbox, wherein the flexbox can be dynamically resized as a window containing the browser is resized or a field containing the flexbox is resized.

12. The non-transitory computer readable medium of claim 7, wherein the displaying the truncated version includes maintaining at least one additional character proximate to the plurality of characters in addition to the plurality of characters.

13. A system comprising:
at least one processor;
a non-transitory computer readable medium comprising instructions stored thereon, the instructions, when executed, being effective to cause the at least one processor to:
receive a search query having a set of characters;
responsive to the search query, identify a set of results relevant to the set of characters;
identify, for search result in the set of results, a format of a string that includes the set of characters determined to occur within a recognized format that corresponds to a function for the string, and determining adjacent characters that are adjacent to characters matching the search query to display based on the format for a respective search result in the set of search results;
label the set of characters and the adjacent characters immutable; and
display the respective search result in the set of search results in a dynamically resizable field, that is adjustable to fit a constrained space, the search results-in a dynamically resizable field, that is adjustable to fit a constrained space, the search results displayed in the dynamically resizable field being a truncated version of respective content associated with the respective search result, each result being truncated, maintaining:
the set of characters;
at least one additional character sufficient to allow the recognized format to remain recognizable in addition to the set of characters, wherein the at least one additional character is not adjacent to the characters matching the search query; and
the adjacent characters labeled as immutable, such that a plurality of characters including content causing the respective result to be considered relevant to the search query are displayed.

14. The system of claim 13, wherein the instructions, when executed, being effective to cause the at least one processor to:
wherein a browser resizes the dynamically resizable field subject to an amount of space available for the dynamically resizable field and creates the truncated version to accommodate an available amount of space in the dynamically resizable field in which to provide the respective result, subject to the immutable label requiring the plurality of characters relevant to the respective results to be displayed.

15. The system of claim 13, wherein the list identifying the set of results is displayed in a constrained space that is limited to a maximum number of characters per line, and each result can occupy a limited number of lines.

16. The system of claim 13, wherein the truncated version of the respective content includes a least a first text portion and second text portion of each result interrupted by truncated portions, wherein at least one of the first text portion or the second text portion includes the plurality of characters.

17. The system of claim 13, wherein the dynamically resizable field is a flexbox, the flexbox is under the control of a browser and is configured to truncate any character other than the set of characters and the adjacent characters labeled as immutable in order to resize the results to fit the size of the flexbox, wherein the flexbox can be dynamically resized as a window containing the browser is resized or a field containing the flexbox is resized.

18. The system of claim 13, wherein the display of the truncated version includes maintaining at least one additional character proximate to the plurality of characters in addition to the plurality of characters.

* * * * *